(12) United States Patent
Whitmarsh et al.

(10) Patent No.: US 7,139,086 B1
(45) Date of Patent: Nov. 21, 2006

(54) PRINT PROCESSING SYSTEM AND METHOD WITH IMAGE ADVISOR SERVICE

(75) Inventors: Michael Dean Whitmarsh, Vancouver, WA (US); William Hertling, Portland, OR (US); Melanie M. Robertson, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 944 days.

(21) Appl. No.: 09/710,368

(22) Filed: Nov. 10, 2000

(51) Int. Cl.
*G06F 15/00* (2006.01)
*G06K 1/00* (2006.01)

(52) U.S. Cl. .................. 358/1.15; 358/1.15; 358/1.9
(58) Field of Classification Search ............... 358/1.15, 358/1.11–1.14, 1.1, 1.9, 1.16–1.18; 715/527; 705/8, 400; 700/100, 101, 102
See application file for complete search history.

(56) References Cited

U.S. PATENT DOCUMENTS

| 4,765,763 | A | | 8/1988 | Ishikawa |
| 5,493,415 | A | | 2/1996 | Mita et al. |
| 6,052,479 | A | | 4/2000 | Hiraishi et al. |
| 6,330,542 | B1 | * | 12/2001 | Sevcik et al. .................. 705/8 |
| 2003/0140315 | A1 | * | 7/2003 | Blumberg et al. .......... 715/527 |

* cited by examiner

*Primary Examiner*—Edward Coles
*Assistant Examiner*—Theirry L. Pham

(57) ABSTRACT

A system and method of processing an image before printing of the image by a print provider includes defining a print processing system controller having a network communication link. The print processing system controller receives a print request and a data file for the image via the network communication link, and processes the print request and the data file to determine an appropriate application for the image.

20 Claims, 7 Drawing Sheets

PRINT PROCESSING SYSTEM AND METHOD WITH IMAGE ADVISOR SERVICE

THE FIELD OF THE INVENTION

The present invention relates generally to print services and, more particularly, to a network system and method of processing an image before printing of the image by a print provider.

BACKGROUND OF THE INVENTION

Commonly, a party can have an image reproduced for a variety of applications. The party can have the image reproduced, for example, for a poster, a mug, a T-shirt, greeting cards, etc. As such, each potential application for the image requires different print resolution and/or print quality needs. In addition, the image is often created by the customer or extracted from another source by the customer. Thus, print resolution and/or print quality of different images can vary considerably.

Unfortunately, when a party requests reproduction of the image for a specific application, the party may not recognize potential print resolution and/or print quality problems associated with reproducing the image for the specific application. Usually, such problems only become apparent once the image has been printed. Thus, the party may be disappointed and, more importantly, may have wasted valuable resources by reproducing the image for the specific application.

Accordingly, a need exists for processing an image before printing of the image by a print provider to automatically check for print resolution and/or print quality problems before the image is reproduced. In particular, a need exists for checking the appropriateness of an image for a potential application.

SUMMARY OF THE INVENTION

One aspect of the present invention provides a method of processing an image before printing of the image by a print provider. The method includes defining a print processing system controller having a network communication link, receiving at the print processing system controller a print request and a data file for the image via the network communication link, and determining an appropriate application for the image via the print processing system controller. The step of determining the appropriate application for the image includes processing the print request and the data file for the image to determine the appropriate application for the image.

Another aspect of the present invention provides a system for processing an image before printing of the image by a print provider. The system includes a print processing system controller adapted to receive a print request and a data file for the image, and process the print request and the data file to determine an appropriate application for the image.

In one embodiment, the present invention provides a system and method of processing an image before printing of the image by a print provider. The system and method utilizes a network communication link with a controller of the system to efficiently receive a print request and a data file for the image and report an appropriate application for the image.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
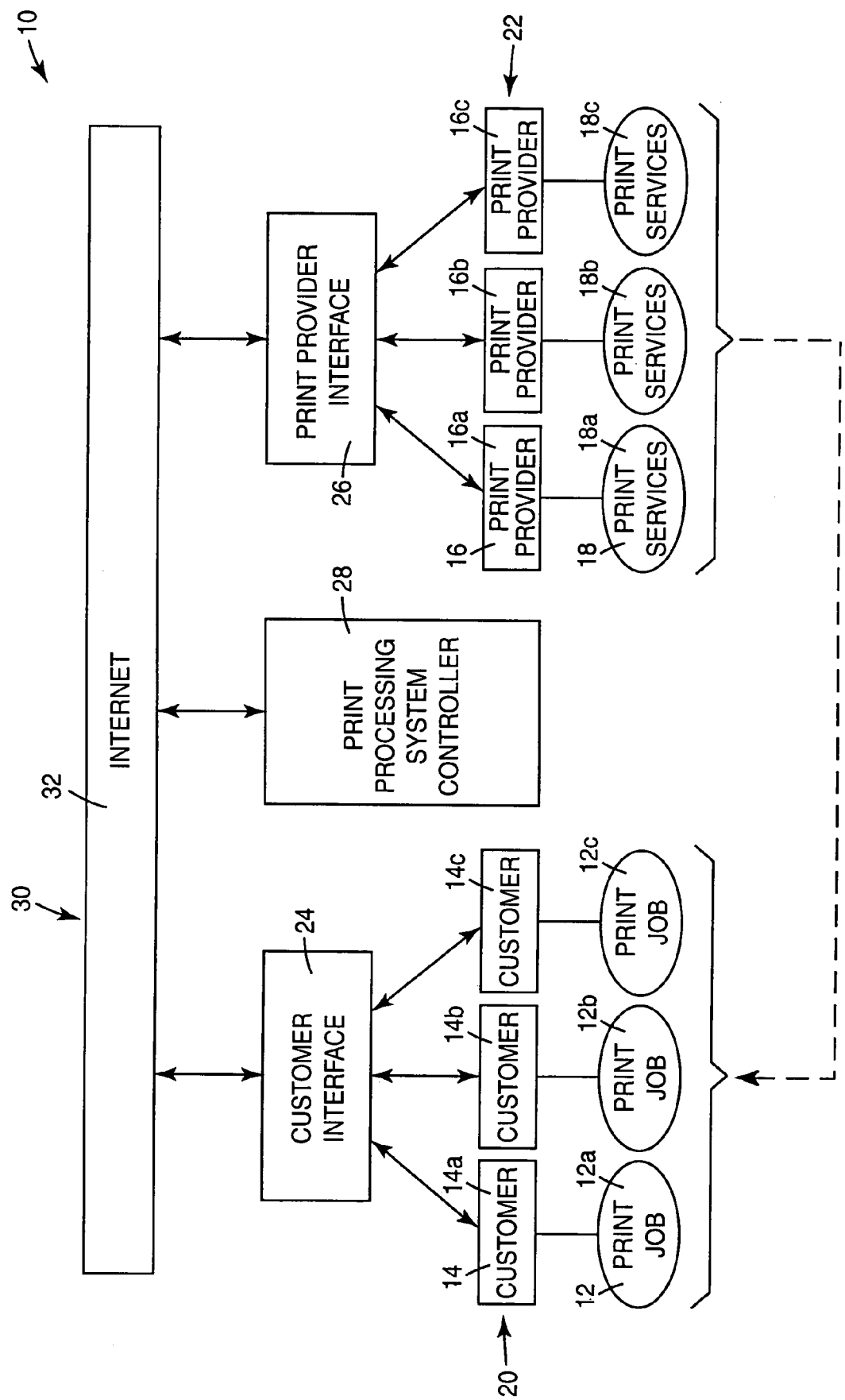
FIG. 1 is a block diagram illustrating one exemplary embodiment of a network print processing system according to the present invention.

A network print processing system according to the present invention is illustrated generally at 10 in FIG. 1. Print processing system 10 facilitates processing of a print job 12 of a customer 14 before printing of print job 12 by a print provider 16 offering print services 18. In particular, print processing system 10 automatically processes a print job 12*a*, 12*b*, 12*c* of a customer 14*a*, 14*b*, 14*c* before printing of print job 12*a*, 12*b*, 12*c* by a print provider 16*a*, 16*b*, 16*c* offering print services 18*a*, 18*b*, 18*c*. For clarity, print job 12*a*, 12*b*, 12*c*, customer 14*a*, 14*b*, 14*c*, print provider 16*a*, 16*b*, 16*c*, and print services 18*a*, 18*b*, 18*c* are referred to hereinafter as print job 12, customer 14, print provider 16, and print services 18, respectively. As such, customer 14 may be one of a plurality of customers 20 each having a separate print job 12. Print provider 16 may be one of a plurality of print providers 22 each providing separate print services 18. Accordingly, print processing system 10 automatically checks and advises customer 14 and/or print provider 16 of an appropriateness of an image of print job 12 for specific applications.

Print job 12, as used herein, is defined to include a piece of work requiring production and/or reproduction of printed matter. Customer 14, as used herein, is defined to include an entity or entities such as a consumer, an employee, or another print provider requesting or soliciting printing services, finishing services, delivery services, and/or other print processing services. Customer 14, therefore, includes any user of such printing, finishing, delivery, and/or other print processing services. Print provider 16, as used herein, is defined to include an entity or entities offering, providing, and/or assisting in printing services, finishing services, delivery services, and/or other print processing services. Print services 18, as used herein, is defined to include printing services, finishing services, delivery services, and/or other print processing services.

In one exemplary embodiment, print processing system 10 includes a customer interface 24, a print provider interface 26, and a print processing system controller 28. As such, customers 20 interact with customer interface 24 and print providers 22 interact with print provider interface 26. It is within the scope of the present invention for multiple customers 20 to each use the same customer interface 24 and/or for each customer 14 to have their own customer interface 24. In addition, multiple print providers 22 may each use the same print provider interface 26 and/or each print provider 16 may have their own print provider interface 26.

Customer interface 24, print provider interface 26, and print processing system controller 28 communicate with each other via a network communication link 30. Network communication link 30, as used herein, is defined to include an internet communication link such as an Internet communication link, an intranet communication link, or similar high-speed communication link. In one preferred embodiment, network communication link 30 includes an Internet communication link 32. While the following description only refers to Internet communication link 32, it is understood that the use of other network communication links is within the scope of the present invention. In addition, network communication link 30 may include a wireless communication link.

In one exemplary embodiment, customers 20, print providers 22, and print processing system controller 28 are all located remote from each other (i.e., at different locations). Thus, communications between customers 20 and print processing system controller 28, communications between print providers 22 and print processing system controller 28, and communications between customers 20 and print providers 22 are conducted over Internet communication link 32. Preferably, print processing system controller 28 communicates with print providers 22 via Internet communication link 32. It is, however, within the scope of the present invention for print processing system controller 28 to communicate with print providers 22 in other manners (e.g., a direct connection or communication link). In addition, it is also within the scope of the present invention for print processing system controller 28 to communicate with customer 14 in other manners (e.g., a direct connection or communication link).

Print processing system 10, including print processing system controller 28, can be implemented in hardware via a microprocessor, programmable logic device, or state machine, in firmware, or in software within a given device. In one aspect, at least a portion of the software programming is written in JAVA programming language, and each of the main components communicate via Internet communication link 32 using a communication bus protocol. For example, the present invention may or may not use a TCP/IP protocol suite for data transport. Other programming languages and communication bus protocols suitable for use with print processing system 10 will become apparent to those skilled in the art after reading the present application.

Print processing system controller 28 includes hardware, software, firmware, or a combination of these. In one preferred embodiment, print processing system controller 28 includes a computer server or other microprocessor based system capable of performing a sequence of logic operations. In addition, print processing system controller 28 can include a microprocessor embedded system/appliance incorporating tailored appliance hardware and/or dedicated single purpose hardware.

Figure 2:
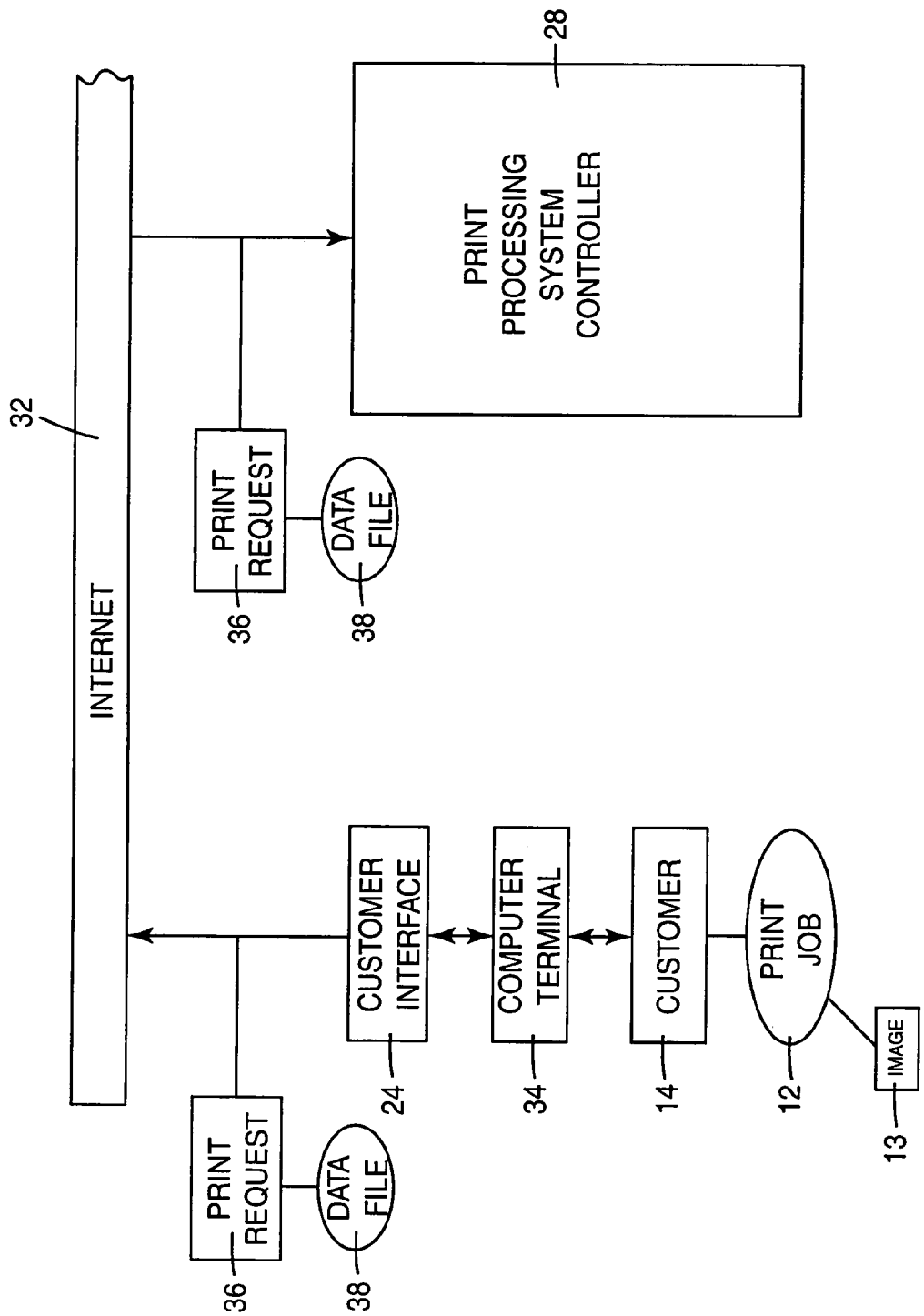
FIG. 2 is a block diagram illustrating one exemplary embodiment of information flow through a portion of the print processing system of FIG. 1.

As illustrated in FIG. 2, print job 12 includes an image 13. Image 13 includes a graphic pattern and/or a character pattern to be reproduced on a print medium including sheet materials such as paper, Mylar, transparencies, photographic paper, etc. and/or other products such as billboards, banners, posters, mugs, cups, clothing, mouse pads, calendars, greeting cards, etc.

Customer 14 accesses customer interface 24 of print processing system 10 via a computer terminal 34. Computer terminal 34 may include, for example, an input device such as a keyboard and/or a mouse and a display device such as a monitor, as is well known in the art. In one exemplary embodiment, computer terminal 34 runs an operating system which can support one or more applications. The operating system is stored in memory and executes on a processor. The operating system is preferably a multi-tasking operating system which allows simultaneous execution of multiple applications, although aspects of this invention may be implemented using a single-tasking operating system.

Customer 14 interacts with customer interface 24 via computer terminal 34 to generate a print request 36 for print job 12, including image 13, and submit print request 36 to print processing system controller 28 via Internet communication link 32. Print request 36 identifies attributes of print job 12 as specified by customer 14. In one exemplary embodiment, a data file 38 for print job 12, including image 13, is associated with print request 36. As such, data file 38 is submitted with print request 36 to print processing system controller 28 via Internet communication link 32.

In one exemplary embodiment, customer interface 24 includes a plurality of input fields with which customer 14 interacts, via an input device such as a keyboard and/or a mouse of computer terminal 34, to generate print request 36 and specify attributes of print job 12. An example of customer interface 24 is described in detail in U.S. patent application Ser. No. 09/686,849, assigned to the assignee of the present invention and incorporated herein by reference.

Figure 3:
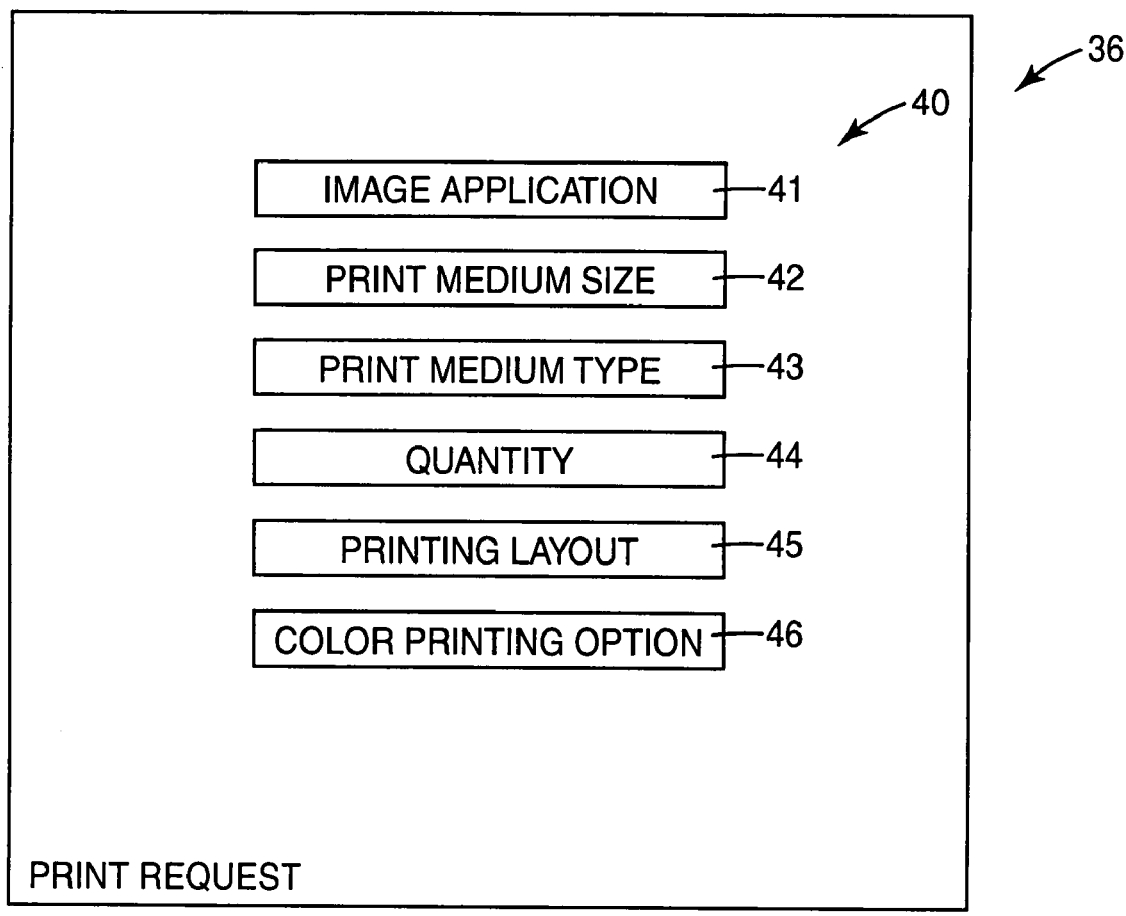
FIG. 3 is a diagram illustrating one exemplary embodiment of a print request generated and submitted with the print processing system of FIG. 1.

In one exemplary embodiment, as illustrated in FIG. 3, print request 36 includes a plurality of print request attributes 40 which define print job 12. Print request attributes 40 include, for example, an image application attribute 41, a print medium size attribute 42, a print medium type attribute 43, a quantity attribute 44, a printing layout attribute 45, and a color printing option attribute 46. Image application attribute 41 includes, for example, a selected or desired application for image 13, including a specific image size for image 13, or a request for appropriate applications for image 13. Print medium size attribute 42 includes a selected or desired size of medium upon which print job 12 is to be printed. Print medium type attribute 43 includes a selected or desired type of medium upon which print job 12 is to be printed. Quantity attribute 44 includes, for example, a number of copies included in print job 12. Printing layout attribute 45 includes a selected or desired layout of how print job 12 is to be printed. Color printing option attribute 46 includes a selected or desired color content for print job 12. It is understood that not all attributes need be specified and that additional attributes may be included in print request 36.

Figure 4:
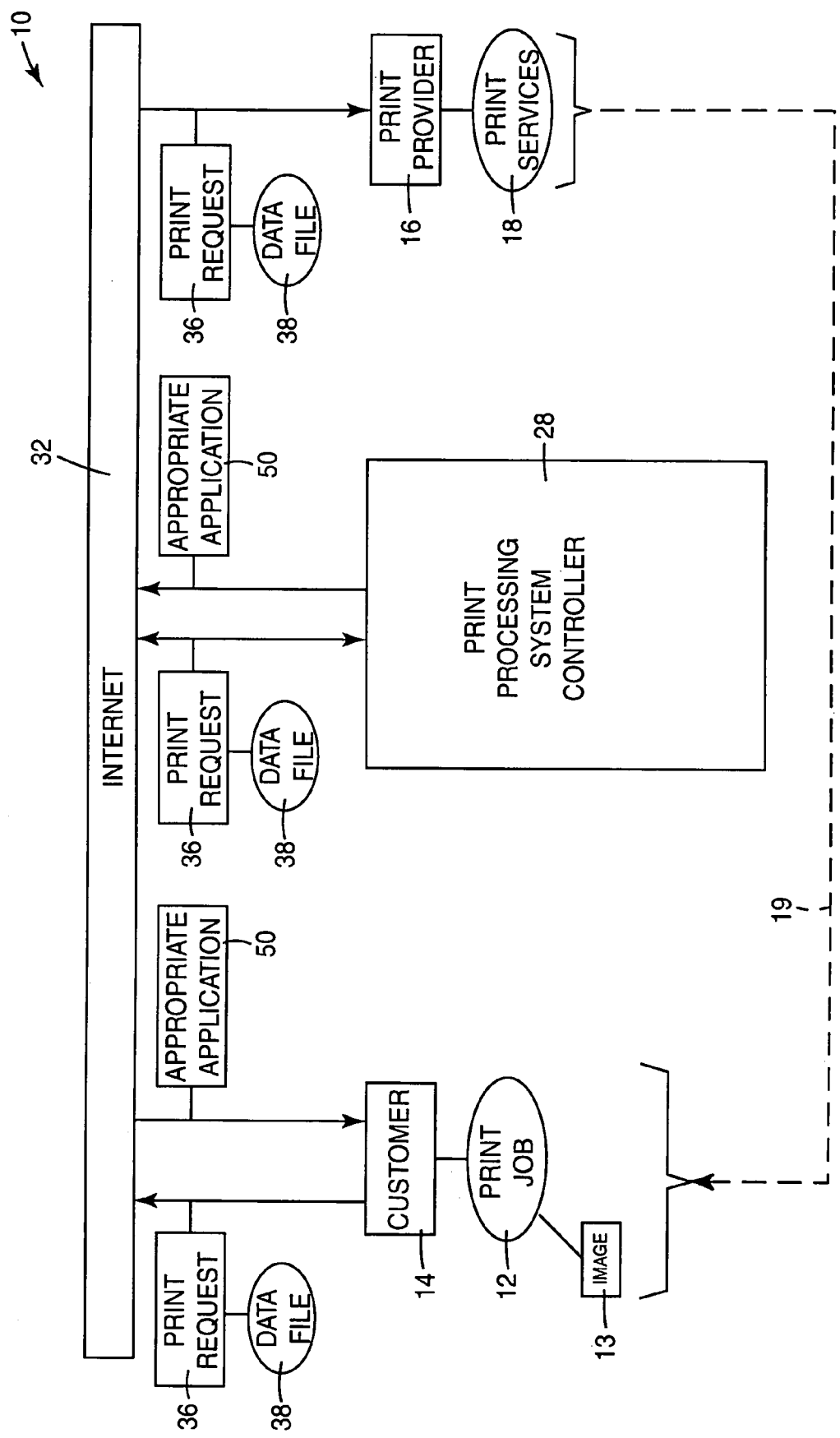
FIG. 4 is a block diagram illustrating one exemplary embodiment of information flow through the print processing system of FIG. 1.

Based on print request 36 and data file 38, print processing system controller 28 determines an appropriate application 50 for image 13, as illustrated in FIG. 4. An application for image 13 includes, for example, printing of image 13 on various medium including sheet materials such as paper, Mylar, transparencies, photographic paper, etc. and/or printing of image 13 on other products such as billboards, banners, posters, mugs, cups, clothing, mouse pads, calendars, greeting cards, etc. An application is appropriate for image 13 if, for example, a resolution of image 13 is sufficient for reproduction on the desired medium and/or a quality of image 13 is sufficient for reproduction on the desired medium. In one exemplary embodiment, print processing system controller 28 utilizes, for example, scaling, conversion, and/or color matching tools, as are well known to those skilled in the art, when determining appropriate application 50 for image 13.

To determine appropriate application 50 for image 13, print processing system controller 28 processes print request 36 and data file 38. As such, print processing system controller 28 inspects print request 36 and determines, for example, a desired or selected application for image 13, a desired or selected print medium size and/or print medium type for image 13, a desired or selected printing layout for image 13, and/or a desired or selected color printing option for image 13.

Print processing system controller 28 also inspects data file 38 and determines, for example, a print resolution, a bit depth, an actual image size, a file size, and/or a quality of image 13. The print resolution of image 13 represents a number of pixels per inch in image 13. The number of pixels per inch for a given image resolution will differ based on the intended dimensions for image 13 since the same number of pixels are being spread out over a different space. The bit depth of image 13 represents a number of colors in image 13. For example, a 1-bit image indicates a monochromatic or black-and-white image, an 8-bit image indicates a color image, and a 24-bit image indicates a color image having a larger color pallet than the 8-bit image. The quality of image 13 is determined by inspecting portions of image 13 and analyzing, for example, the sharpness, contrast, and/or brightness of image 13. The quality of image 13 is also determined by considering the file size of image 13 in view of the print resolution of image 13. A high-quality image, for example, should have a high print resolution and, therefore, a large file size. A high-resolution image having a small file size, therefore, may indicate a poor quality image. Such an image, therefore, may not be appropriate for reproduction.

In one exemplary embodiment, print request 36 includes a specific application for image 13. As such, print processing system controller 28 determines whether the specific application is appropriate for image 13. For example, if the specific application included in print request 36 is a greeting card and the original size and resolution of image 13 are, for example, 3-inch by 5-inch and 150 dots-per-inch (dpi), respectively, print processing system controller 28 concludes that the specific application for image 13 as being a greeting card is an appropriate application of image 13. If, however, print processing system controller 28 determines that image 13 is of poor quality based on analysis of image 13, print processing system controller 28 concludes that the specific application for image 13 as being a greeting card is not an appropriate application of image 13 since any reproduction of image 13 would result in a poor quality image.

In one exemplary embodiment, print request 36 includes a request for a specific print medium size on which image 13 is to be printed. As such, print processing system controller 28 determines whether the specific print medium size is appropriate for image 13. For example, if the specific print medium size included in print request 36 is a poster size (e.g., 24-inch by 36-inch) and the original size and resolution of image 13 are, for example, 3-inch by 5-inch and 150 dpi, respectively, print processing system controller 28 concludes that the request for the print medium size as being poster size is not an appropriate application of image 13 since reproducing image 13 at such a size would result in a poor quality image.

In one exemplary embodiment, print request 36 includes a request for which applications are appropriate for image 13. As such, print processing system controller 28 identifies one or more appropriate applications for image 13. For example, if print processing system controller 28 determines that image 13 is a 3-inch by 5-inch image with an 8-bit depth, 150 dpi resolution, and of high image quality, print processing system controller 28 concludes that image 13 is appropriate, for example, for a greeting card, 4-inch by 6-inch photographic reprints, a mouse pad, or a pocket logo of a T-shirt. Print processing system controller 28, however, also concludes that image 13 is not appropriate, for example, for a poster, a banner, or a billboard.

Accordingly, appropriate application 50 for image 13 includes confirmation that a specific application is appropriate for image 13 and/or identification of one or more appropriate applications for image 13. In addition, appropriate application 50 for image 13 includes, for example, a maximum size or range of sizes for image 13 and/or a best quality or quality range for image 13. In one exemplary embodiment, print processing system controller 28 reports appropriate application 50 to customer 14 via Internet communication link 32.

In one exemplary embodiment, as illustrated in FIG. 4, customer 14 submits print request 36 and data file 38 for print job 12 to print provider 16 after print processing system controller 28 determines, based on print request 36 and data file 38, that print request 36 is an appropriate application for image 13. If, however, print processing system controller 28 determines that print request 36 is not an appropriate application for image 13, customer 14 can modify print request 36 in view of appropriate application 50 or cancel print request 36 for print job 12. If customer 14 modifies print request 36, customer 14 can resubmit print request 36 and data file 38 for image 13 to print processing system controller 28.

Preferably, customer 14 submits print request 36 and data file 38 to print provider 16 via Internet communication link 32. As such, print provider 16 completes print job 12 with print services 18 and delivers print job 12 to customer 14, as represented by dashed line 19. In one exemplary embodiment, print request 36 and data file 38 are automatically submitted to print provider 16 from print processing system controller 28, if print processing system controller 28 determines, based on print request 36 and data file 38, that print request 36 is an appropriate application for image 13. Preferably, print processing system controller 28 submits print request 36 and data file 38 for print job 12 to print provider 16 via Internet communication link 32. It is, however, within the scope of the present invention for print processing system controller 28 to submit print request 36 and data file 38 to print provider 16 in other manners (e.g., a direct connection).

Figure 5:
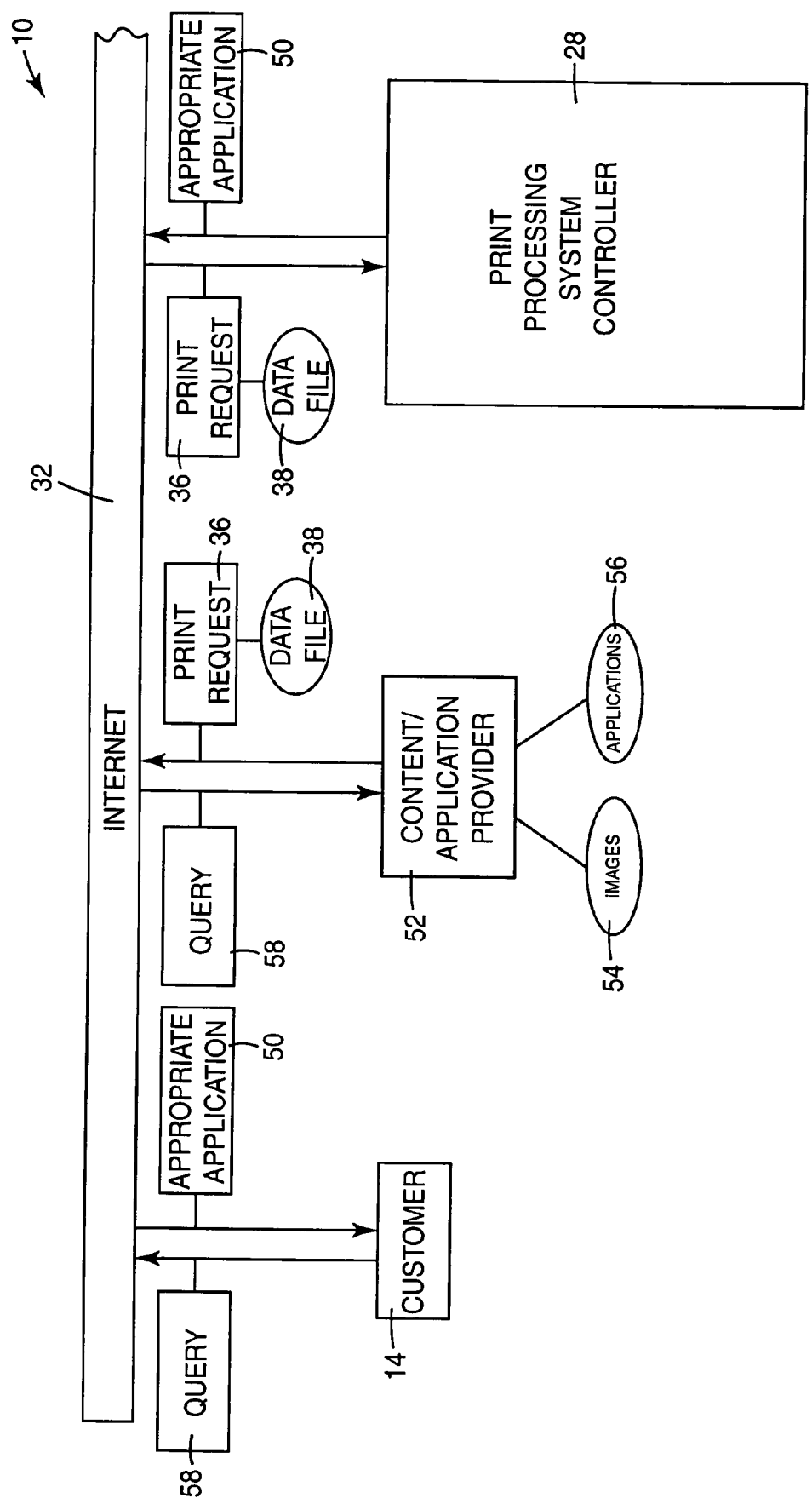
FIG. 5 is a block diagram illustrating one exemplary embodiment of information flow through a portion of the print processing system of FIG. 1.

In one exemplary embodiment, as illustrated in FIG. 5, a content/application provider 52 provides a plurality of images 54 and/or a plurality of applications 56 for images. As a content provider, content/application provider 52 provides images 54. As an application provider, content/application provider 52 provides applications 56 for images, including images 54 and image 13. As a content and application provider, content/application provider 52 provides images 54 and applications 56 for images 54. It is understood that processing of images 54 by print processing system controller 28 is the same as that described with regards to image 13. As such, reference herein to image 13 is also applicable to images 54.

Customer 14 communicates with content/application provider 52 via Internet communication link 32 and submits a query 58 to content/application provider 52 for images 54 and/or applications 56. As such, customer 14 browses images 54 and/or applications 56 of content/application provider 52 and selects at least one image 54 and/or at least one application 56. Thus, customer 14 creates print request 36 for image 54 through content/application provider 52 and submits print request 36 and data file 38 for image 54 to print processing system controller 28 in a manner similar to that illustrated in FIG. 2 and described above. Accordingly, print processing system controller 28 processes print request 36 and data file 38 for image 54 and reports appropriate application 50 to customer 14, as illustrated in FIG. 4 and described above. It is also within the scope of the present invention for customer 14 to download a data file for one or more images 54 from content/application provider 52 and submit print request 36 and data file 38 for image 54 to print processing system controller 28 as illustrated in FIG. 2.

In one exemplary embodiment, content/application provider 52 is located remote from customers 20 and print processing system controller 28. Thus, communications between customers 20 and content/application provider 52, and communications between content/application provider 52 and print processing system controller 28 are conducted over Internet communication link 32. Preferably, content/application provider 52 communicates with print processing system controller 28 via Internet communication link 32. It is, however, within the scope of the present invention for content/application provider 52 to communicate with print processing system controller 28 in other manners (e.g., a direct connection).

Figure 6:
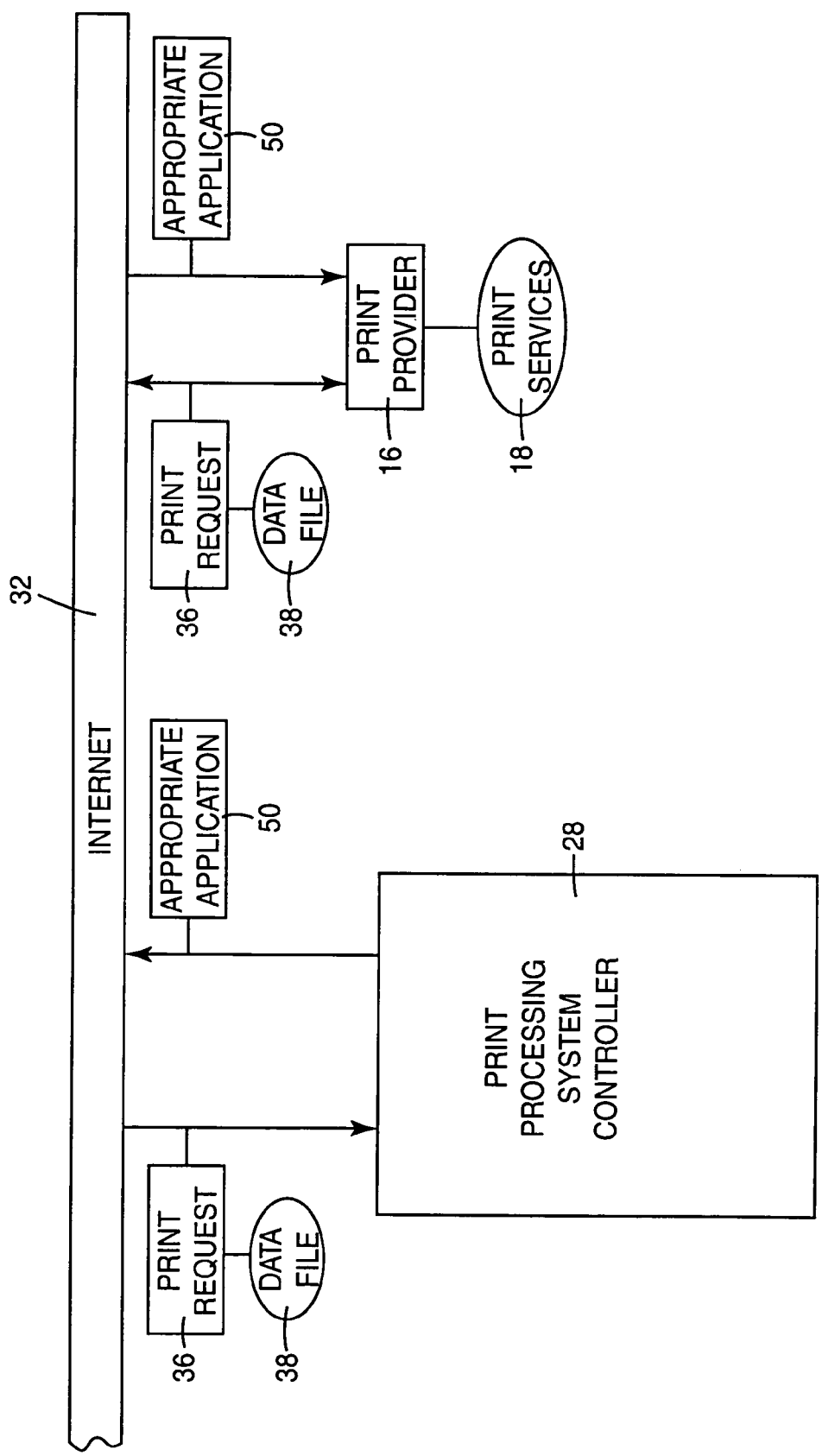
FIG. 6 is a block diagram illustrating one exemplary embodiment of information flow through a portion of the print processing system of FIG. 1.

In one exemplary embodiment, as illustrated in FIG. 6, after print provider 16 receives print request 36 and data file 38 for print job 12 and before print provider 16 prints print job 12, print provider 16 submits print request 36 and data file 38 for print job 12, including image 13, to print processing system controller 28. Print provider 16 submits print request 36 and data file 38 to print processing system controller 28 before printing to ensure that print request 36 is an appropriate application for image 13. As such, print processing system controller 28 processes print request 36 and data file 38, as described above, and reports appropriate application 50 to print provider 16. It is also within the scope of the present invention for print processing system controller 28 to report appropriate application 50 to customer 14. If print request 36 is an appropriate application for image 13, print provider 16 completes print job 12. If print request 36, however, is not an appropriate application for image 13, as indicated by appropriate application 50, print provider 16 can notify customer 14. Customer 14, therefore, can change or modify print request 36 before resubmitting print request 36 and data file 38 to print provider 16 or can cancel print job 12.

Figure 7:
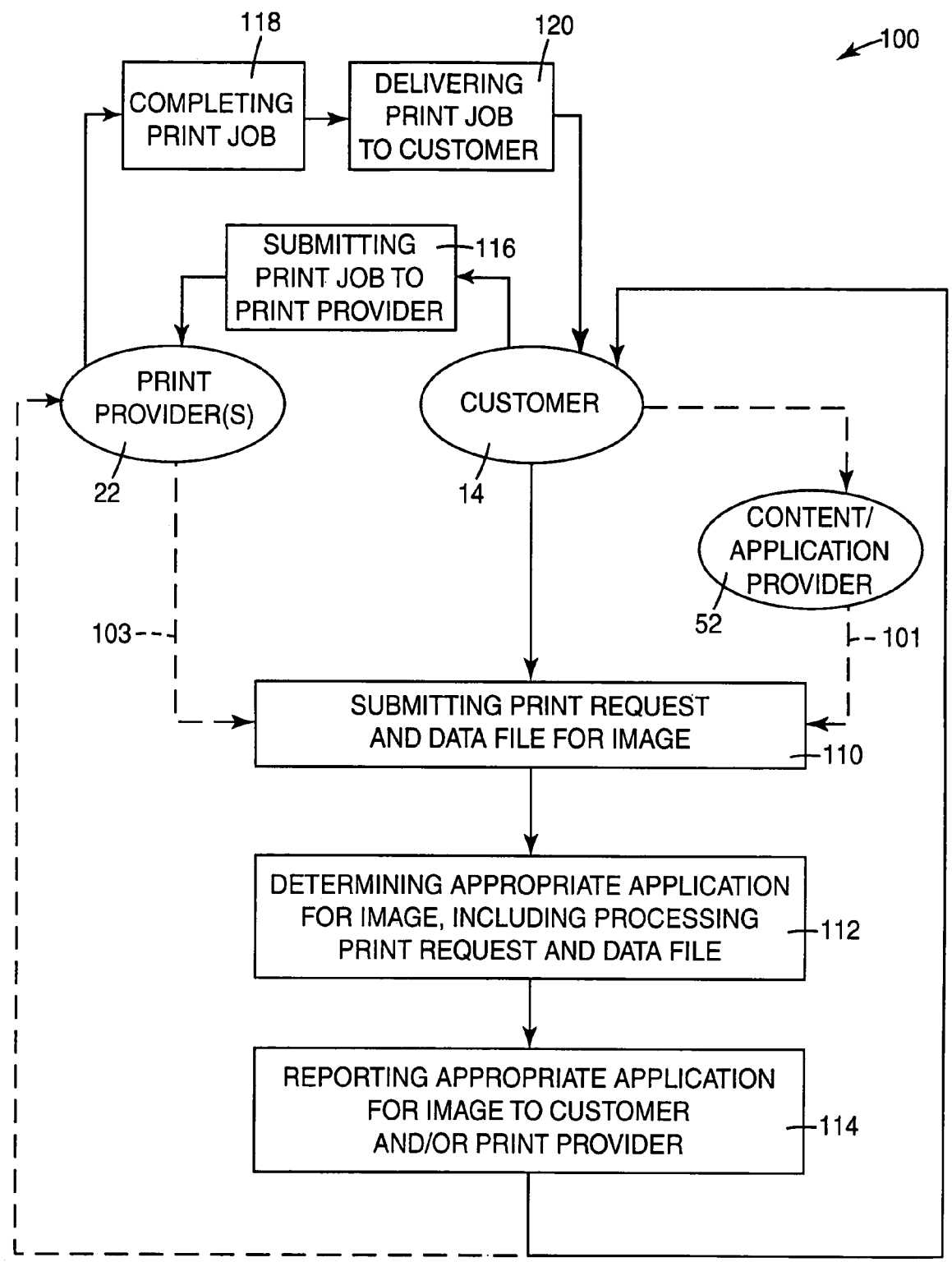
FIG. 7 is a flow diagram illustrating one exemplary embodiment of a method of processing an image before printing of the image by a print provider according to the present invention.

In FIG. 7, a flow diagram illustrating one exemplary embodiment of a method of processing image 13 of print job 12 before printing of image 13 by print provider 16 according to the present invention is illustrated generally at 100. Reference is also made to FIGS. 1–6. At step 110, print processing system controller 28 receives print request 36 and associated data file 38 for image 13. In one exemplary embodiment, print processing system controller 28 receives print request 36 and data file 38 for image 13 from customer 14. It is, however, also within the scope of the present invention for print processing system controller 28 to receive print request 36 and data file 38 for image 13 from content/application provider 52 and/or print provider 16 as represented by dashed line 101 and dashed line 103, respectively. As such, print processing system controller 28 receives print request 36 and data file 38 from content/application provider 52 at the direction of customer 14 and from print provider 16 on behalf of customer 14. In one exemplary embodiment, print request 36 and data file 38 for image 13 are submitted to print processing system controller 28 via Internet communication link 32, as illustrated in FIGS. 4–6.

Next, in step 112, print processing system controller 28 determines appropriate application 50 for image 13. To determine appropriate application 50 for image 13, print processing system controller 28 processes print request 36 and data file 38 for image 13. By processing print request 36, print processing system controller 28 determines, for example, a desired or selected application, print medium size and/or type, and/or color printing option for image 13. By processing data file 38 for image 13, print processing system controller 28 determines, for example, a print resolution of image 13, a bit depth of image 13, a file size of image 13, and/or a quality of image 13.

In one exemplary embodiment, print processing system controller 28 determines whether a specific application, as indicated in print request 36, is appropriate for image 13. In addition, print processing system controller 28 determines one or more appropriate applications for image 13 in response to a request for applications of image 13 included in print request 36.

In one exemplary embodiment, print processing system controller 28 determines whether a request for a specific print medium size, as indicated in print request 36, is appropriate for image 13. In addition, print processing system controller 28 determines an appropriate print medium size for image 13 and/or an appropriate quality of image 13. As such, print processing system controller 28 determines, for example, a range of print mediums sizes for image 13 and/or a quality level for image 13.

Next, in step 114, print processing system controller 28 presents or reports appropriate application 50 for image 13 to customer 14 and/or print provider 16. In one exemplary embodiment, if print processing system controller 28 determines whether a request for a specific print medium size or a specific application, as indicated in print request 36, is appropriate for image 13, print processing system controller 28 reports a favorable response (e.g., a plus, a thumbs-up) or an unfavorable response (e.g., a minus, a thumbs-down), a rating (e.g., one to three) or other indication as to the appropriateness of image 13 for the specific application. In addition, if print processing system controller 28 determines appropriate applications for image 13, print processing system controller 28 presents a list or table of applications appropriate for image 13. Furthermore, if print processing system controller 28 determines a range of print medium sizes and/or a quality level for image 13, print processing system controller 28 presents a list or table of print medium sizes and/or quality levels appropriate for image 13.

Next, in step 116, print request 36 and data file 38 for print job 12 are submitted to print provider 16. In one exemplary embodiment, print request 36 and data file 38 for print job 12 are submitted to print provider 16 via Internet communication link 32. In addition, print request 36 and data file 38 are automatically submitted to print provider 16 if print request 36 is an appropriate application for image 13. Thus, customer 14 continues with print request 36 for print job 12. If, however, print request 36 is not an appropriate application for image 13, customer 14 can modify print request 36 in view of appropriate application 50 and resubmit print request 36 and data file 38 for image 13 to print processing system controller 28 or cancel print request 36 for print job 12.

In one exemplary embodiment, print request 36 and data file 38 for print job 12 are submitted to print provider 16 by customer 14 before being submitted to print processing system controller 28. As such, print provider 16 submits print request 36 and data file 38 to print processing system controller 28 as represented by dashed line 103. Thereafter, steps 110, 112, and 114 are performed as described above. Thus, print processing system controller 28 presents or reports appropriate application 50 for image 13 to print provider 16 and/or customer 14.

Next, in step 118, print provider 16 completes print job 12, including printing image 13, and, in step 120, delivers print job 12 to customer 14. Delivery of completed print job 12, including image 13, to customer 14 from print provider 16 is also represented by the dashed line in FIG. 1.

By processing print request 36 and data file 38 for print job 12, including image 13, before printing of image 13 by print provider 16, print processing system 10 automatically determines an appropriateness of image 13 for specific applications. More specifically, by inspecting, for example, a desired or selected application, print medium size and/or type, and/or color printing option of print request 36 as well as a resolution, bit depth, file size, and/or image quality of image 13, print processing system 10 automatically identifies reproduction problems such as too small of a resolution and/or poor image quality before print job 12 is printed. Thus, print processing system 10 performs a "pre-flight" check of print request 36 and data file 38 to make sure that print job 12 is ready to be printed. Accordingly, print processing system 10 advises customer 14 and/or print provider 16 of an appropriateness of image 13 for specific applications.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of processing an image before printing of the image by a print provider, the method comprising:
    defining a print processing system controller having a network communication link;
    receiving at the print processing system controller a print request and a data file for the image via the network communication link, the print request identifying one of a specified application and a specified printing option including at least one of a print medium size and a print medium type for the image; and
    determining an appropriate application for the image with the print processing system controller based, in part, on the image, including processing the print request and the data file for the image by the print processing system controller to detect an image characteristic including at least one of a print resolution, a bit depth, a size, a file size, and a quality of the image and detect the one of the specified application and the specified printing option for the image, and including comparing the image characteristic and the one of the specified application and the specified printing option to determine the appropriate application for the image.

2. The method of claim 1, wherein the network communication link includes an Internet communication link.

3. The method of claim 1, further comprising:
    defining the network communication link between a customer and the print processing system controller, and wherein receiving the print request and the data file for the image includes receiving the print request and the data file for the image from the customer via the network communication link.

4. The method of claim 1, further comprising:
    defining the network communication link between a customer and the print processing system controller; and
    reporting the appropriate application for the image to the customer via the network communication link.

5. The method of claim 1, further comprising:
    defining the network communication link between the print provider and the print processing system controller, and wherein receiving the print request and the data file for the image includes receiving the print request and the data file for the image from the print provider via the network communication link.

6. The method of claim 1, further comprising:
    defining the network communication link between the print processing system controller and at least one of a content provider offering a plurality of images and an application provider offering an application for the image, and wherein receiving the print request and the data file for the image includes receiving the print request and the data file for the image from the at least one of the content provider and the application provider via the network communication link.

7. The method of claim 1, wherein receiving the print request and the data file for the image includes receiving a request for a plurality of appropriate applications for the image.

8. The method of claim 1, wherein determining the appropriate application for the image includes determining an appropriate print medium size for the image.

9. The method of claim 1, wherein determining the appropriate application for the image includes determining an appropriate quality for the image.

10. The method of claim 1, wherein receiving the print request and the data file for the image includes specifying at least one of a print medium size and a print medium type for the image, and wherein determining the appropriate application for the image further includes determining whether the at least one of the print medium size and the print medium type is appropriate for the image.

11. A system for processing an image before printing of the image by a print provider, the system comprising:
    a print processing system controller adapted to receive a print request and a data file for the image, and process the print request and the data file to determine an appropriate application for the image based, in part, on the image, wherein the print request identifies one of a specified application and a specified printing option including at least one of a print medium size and a print medium type for the image, wherein the print processing system controller is adapted to detect an image characteristic including at least one of a print resolution, a bit depth, a size, a file size, and a quality of the image, and wherein the print processing system controller is adapted to compare the image characteristic and the one of the specified application and the specified printing option to determine the appropriate application for the image.

12. The system of claim 11, wherein the print processing system controller is configured to communicate via a network communication link, and wherein the print processing system controller is adapted to receive the print request and the data file for the image via the network communication link.

13. The system of claim 12, wherein the network communication link is an Internet communication link.

14. The system of claim 12, wherein the network communication link is defined between a customer and the print processing system controller, and wherein the print processing system controller is adapted to receive the print request and the data file for the image from the customer via the network communication link.

15. The system of claim 12, wherein the network communication link is defined between a customer and the print processing system controller, and wherein the print processing system controller is adapted to report the appropriate application for the image to the customer via the network communication link.

16. The system of claim 12, wherein the network communication link is defined between the print provider and the print processing system controller, and wherein the print processing system controller is adapted to receive the print request and the data file for the image from the print provider via the network communication link.

17. The system of claim 12, wherein the network communication link is defined between the print processing system controller and at least one of a content provider offering a plurality of images and an application provider offering an application for the image, and wherein the print processing controller is adapted to receive the print request and the data file for the image from the at least one of the content provider and the application provider via the network communication link.

18. The system of claim 11, wherein the print request includes a request for a plurality of appropriate applications for the image.

19. The system of claim 11, wherein the appropriate application for the image includes an appropriate print medium size for the image.

20. The system of claim 11, wherein the appropriate application for the image includes an appropriate quality for the image.

* * * * *